Sept. 28, 1926.
T. J. DOWNEY
SEPTIC TANK
Filed April 24, 1924
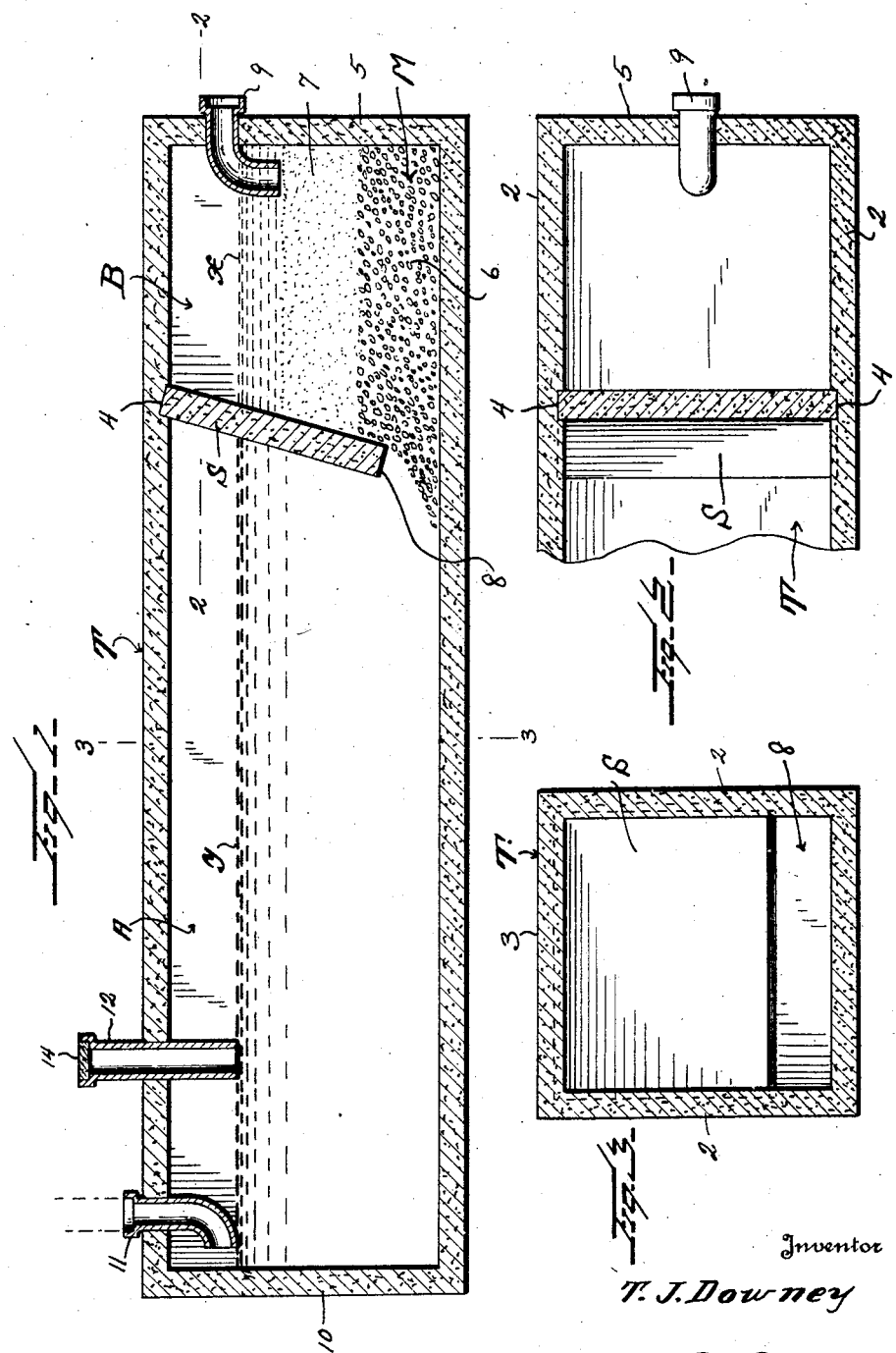
Inventor
T. J. Downey
By Watson E. Coleman
Attorney Patented Sept. 28, 1926.

1,601,611

UNITED STATES PATENT OFFICE.

THOMAS JEFFERSON DOWNEY, OF HUNTINGTON, WEST VIRGINIA.

SEPTIC TANK.

Application filed April 24, 1924. Serial No. 708,802.

This invention relates to certain improvements in septic tanks and it is an object of the invention to provide a novel and improved structure of this kind divided into two chambers in communication with each other at the lower portion thereof, one of said chambers constituting a sludge or breeding chamber and the second a filtering or effluent chamber and a charging tube in communication with the breeding or sludge chamber through the top thereof, said tube also providing means whereby the tank may be pumped out as desired or an inspection of the tank accomplished without the necessity of destroying the tank.

Another object of the invention is to provide a novel and improved device of this general character wherein the inlet for the tank is arranged and mounted in a manner whereby the waste matter discharged within the tank has its force reduced in a manner so as not to disturb the breeding of the bacteria in the sludge chamber.

The invention consists in the details of construction and in the combination and arrangement of the several parts of my improved septic tank whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:—

Figure 1 is a longitudinal sectional view taken through a septic tank constructed in accordance with an embodiment of my invention;

Figure 2 is a fragmentary horizontal sectional view taken substantially on the line 2—2 of Figure 1;

Figure 3 is a vertical sectional view taken substantially on the line 3—3 of Figure 1;

As disclosed in the accompanying drawings, T denotes a closed tank of requisite dimensions and having its walls preferably formed of cementitious material, the upper portion of the tank at a predetermined point adjacent to an end thereof having disposed thereacross a partition or slab S dividing the interior of the tank T into the chambers A and B, the chamber A constituting a breeding or sludge chamber and the chamber B constituting a filtering or effluent chamber. The slab S, when applied, has its lower edge or margin terminating a desired distance above the bottom 1 of the tank T but in relative close proximity thereto and the side and top portions of the slab extend within the side walls 2 and top wall 3 of the tank T, each of said walls during construction being provided with a suitable groove 4 to receive the adjacent marginal portion of the slab S. The slab S is also disposed on an upward incline toward the adjacent end wall 5 of the tank T whereby the horizontal area of the filtering or effluent chamber B decreases upwardly and the corresponding area of the breeding or sludge chamber A increases upwardly.

The chamber B has arranged therein a filtering medium M herein disclosed as a lower strata 6 of gravel and an upper strata 7 of sand, the strata 6 being of a depth to extend above the opening 8 disposed transversely of the tank T and arranged below the lower edge of the slab S to afford communication between the chambers A and B. The upper strata 7 of sand terminates below the liquid level $x$ of the filtered matter within the chamber B.

In communication with the filtering or effluent chamber B through the end wall 5 is an outlet or discharge elbow 9, the inserted end portion of which being positioned closely adjacent to said wall 5 and the top surface of the sand strata 7.

The top wall 3 of the tank T at a point in relatively close proximity to the opposite end wall 10 of the tank T has disposed therethrough the inlet elbow 11, the inner or discharging end of which facing in a position in relatively close proximity to said end wall 10 so that the waste matter discharged within the tank T through said elbow will strike the end wall 10 and thereby materially reducing the force of such material as received within the tank so as not to disturb the breeding of the bacteria in the waste matter within the chamber A.

The inner or inserted end of the inlet elbow 11 is preferably directly above the normal level $y$ of the waste matter within the chamber A as determined by the outlet or discharge elbow 9.

Also extending within the chamber A through the top wall 3 of the tank is a charging tube 12, said tube as herein disclosed being positioned inwardly of the inlet elbow 11. Normally, the outer end of the tube 12 is sealed, as at 14, preferably by cement.

The tube 12 permits a ready and convenient recharging of the tank and also provides means whereby the vacuum can be created within the chamber A to clean out the tank as well as opening a clogged sewer. The tube 12 also affords a medium whereby the tank may be inspected by a health officer at any time without the necessity of destroying the tank.

The slab S compels all of the water within the chamber A to pass inwardly within the chamber B upwardly through the filtering medium M before such water passes out of the outlet or discharge elbow 9 and the particular mounting of the slab prevents the emission of odor from the tank and also prevents any back flow of water into the tank unless it passes down through a filtering medium M.

From the foregoing description it is thought to be obvious that a septic tank constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A septic tank having a partition therein dividing said tank into a breedng chamber and a filtering chamber, said partition terminating above the bottom wall of the tank whereby an opening is provided affording communication between the chambers, and a filtering medium within the lower portion of the filtering chamber and extending above such opening, said filtering chamber being provided with an outlet postioned above the filtering medium, the breeding chamber being provided with an inlet, said inlet being arranged closely adjacent to and discharging against a wall of the breeding chamber at a point above the normal level of the waste matter within said breeding chamber as determined by the outlet from the filtering chamber.

In testimony whereof I hereunto affix my signature.

THOMAS JEFFERSON DOWNEY.